United States Patent
Cantillo et al.

(10) Patent No.: US 9,423,521 B2
(45) Date of Patent: Aug. 23, 2016

(54) METHOD OF DETERMINING THE POSITION OF A DETECTOR DISPOSED AT THE BOTTOM OF THE SEA

(75) Inventors: Juan Cantillo, Courbevoie (FR); Jean-Luc Boelle, Courbevoie (FR); Didier Lecerf, Massy (FR)

(73) Assignees: TOTAL SA, Courbevoie (FR); CGGVERITAS SERVICES S.A., Massy (FR)

( * ) Notice: Subject to any disclaimer, the term of this patent is extended or adjusted under 35 U.S.C. 154(b) by 692 days.

(21) Appl. No.: 13/640,017

(22) PCT Filed: Mar. 25, 2011

(86) PCT No.: PCT/FR2011/050660
§ 371 (c)(1),
(2), (4) Date: Oct. 8, 2012

(87) PCT Pub. No.: WO2011/124813
PCT Pub. Date: Oct. 13, 2011

(65) Prior Publication Data
US 2013/0041616 A1    Feb. 14, 2013

(30) Foreign Application Priority Data
Apr. 6, 2010    (FR) .................................... 10 52600

(51) Int. Cl.
| | | |
|---|---|---|
| *G01L 7/00* | (2006.01) | |
| *G01V 1/38* | (2006.01) | |
| *G01S 5/26* | (2006.01) | |
| *G01L 9/00* | (2006.01) | |

(52) U.S. Cl.
CPC ............... *G01V 1/3835* (2013.01); *G01S 5/26* (2013.01)

(58) Field of Classification Search
CPC .................................................... G01V 1/3835
See application file for complete search history.

(56) References Cited

U.S. PATENT DOCUMENTS

| | | |
|---|---|---|
| 4,641,287 A | 2/1987 | Neeley |
| 2010/0002538 A1 | 1/2010 | Frivik et al. |
| 2011/0038230 A1* | 2/2011 | Napolitano et al. .......... 367/127 |

FOREIGN PATENT DOCUMENTS

| | | |
|---|---|---|
| FR | 2 930 649 A1 | 10/2009 |
| GB | 2 394 049 A | 4/2004 |
| GB | 2298920 | 9/2006 |
| GB | 2425597 | 11/2006 |

\* cited by examiner

*Primary Examiner* — Phuong Huynh
(74) *Attorney, Agent, or Firm* — Patterson, Thuente Pedersen, P.A.

(57) ABSTRACT

A method of determining the position of a detector disposed under the sea, comprising the following steps: emit N waves from N emission points, record the propagation time of said wave between each emission point and the detector; determine the P time intervals Ti, with P≥1 such that, for each time interval Ti, there exist Mi emission points, Mi≥3 for 1≤i≤P, whose propagation times lie in the time interval, determine for each time interval Ti of the circle which passes closest to the Mi points whose propagation time lies in said time interval, and then determine the position of the detector as being the barycenter of the P centers of the circles determined previously.

8 Claims, 2 Drawing Sheets

METHOD OF DETERMINING THE POSITION OF A DETECTOR DISPOSED AT THE BOTTOM OF THE SEA

PRIORITY CLAIM

The present application is a National Phase entry of PCT Application No. PCT/FR2011/050660, filed Mar. 25, 2011, which claims priority from French Application Number 10 52600, filed Apr. 6, 2010, the disclosures of which are hereby incorporated by reference herein in their entirety.

FIELD OF THE INVENTION

The invention relates to subsurface exploration techniques, and in particular to a method of determining the position of a detector placed under the sea, in particular on the surface of the seabed.

BACKGROUND OF THE INVENTION

It is known, particularly in oil exploration, to produce seismic images from a series of geophysical measurements conducted from the surface of a subsoil region. In the seismic technique, these measurements involve emitting a wave into the subsoil and measuring a signal containing reflections of the wave on the geological structures encountered. These structures are typically the surfaces separating different materials or faults.

Seismic images are representations of the subsoil in two or three dimensions, with the vertical dimension corresponding either to the propagation times of the seismic waves, or to the depths. They are obtained by techniques known by the term "migration" which use a model of estimated velocity providing a map of the seismic wave propagation speed in the rocks constituting the area being explored. This velocity model is used to estimate the positions of the reflectors in the subsoil based on seismic recordings. The seismic images produced in this way have some distortions of course, as do the underlying velocity models, because these are only estimates derived from a necessarily limited number of measurements.

In the case of marine subsurface exploration, seismic wave detectors are generally placed at the bottom of the sea on the subsoil to be explored. Seismic waves are emitted from the ocean surface. These waves propagate in the water and enter the subsoil. The detectors placed on the seabed on the surface of the subsoil will detect the arrival of the direct seismic wave as well as the waves reflected by the subsoil.

In order to monitor the evolution of a oil reservoir in the subsurface, it is possible to obtain a first seismic image of the subsoil at a given moment then obtain a second seismic image of the same subsoil after a certain amount of time.

In particular, to track changes in hydrocarbon content of a reservoir in production, it can be useful to monitor the evolution of the seismic image of the subsoil over time.

In order to be able to compare two seismic images of the same subsoil region, it is important to know how to position each detector on the surface of the subsoil as accurately as possible.

The detectors are generally positioned at the bottom of the sea at a depth of several hundred meters using a Remotely Operated Vehicle (ROV) controlled from the surface. However, the operating constraints on deploying such vehicles combined with the accuracy of their onboard acoustic positioning systems, which require long stabilization and calibration times, commonly lead to inaccurate positioning of the receiver relative to the planned position.

Generally, the position of the detector is only known to a precision of about 10 meters.

In a context where sets of measurements are collected at different times, this implies an uncertainty of 20 m in the position of the detector, which considerably reduces the repeatability of the measurements.

It is possible to determine the position of a detector by triangulation. Three seismic waves are emitted from three points on the surface and the distance between the detector and the coordinates of each emission point is calculated based on the travel time of the seismic wave.

The accuracy of such a method is based on knowing both the bathymetry and the seismic wave propagation speed in water. This propagation speed can vary substantially, particularly as the water temperature and salinity vary. Also, the bathymetry is generally measured using acoustic means which are themselves dependent on the speed in water and other parameters. The accuracy of the triangulation method will therefore vary substantially from one set of measurements to another.

A need therefore exists for a means of more accurately positioning detectors placed at the bottom of the sea, based on neither knowledge of the wave propagation speed in water nor on the bathymetry. It is sufficient for this method to determine the position in a plane, because it is known that the detectors are placed on the surface of the seabed.

SUMMARY OF THE INVENTION

The invention therefore proposes a method of determining the position of a detector placed under the sea, comprising the steps of:
  emitting N waves from N emission points,
  recording for each emission point a propagation time of said wave between said emission point and the detector,
  determining P time intervals $T_i$ where $P \geq 1$ such that, for each time interval $T_i$, there exist, among the N emission points, $M_i$ emission points, $M_i \geq 3$ for $1 \leq i \leq P$, having propagation times in said time interval,
  determining for each time interval $T_i$ a circle which passes closest to the $M_i$ points whose propagation time lies in said time interval,
  determining the position of the detector as being at the bottom of the sea, vertically aligned with the barycenter of the P centers of the previously determined circles.

Advantageously, the method of the invention allows determining the position of the detectors completely independently of the wave propagation speed in the water and the bathymetry.

A method of the invention may additionally comprise one or more of the following optional features, individually or in any possible combination:
  the method for determining the circle passing closest to the $M_i$ points is chosen from among the following methods:
    the ordinary least squares method,
    the generalized least squares method, or
    the weighted least squares method;
  the position of the detector is the center of mass of the P centers of the previously determined circles;
  The P time intervals $T_i$ are determined such that, relative to the detector, the maximum angular displacement between two consecutive points $M_i$ whose propagation times lie in said time interval is less than or equal to 120°; and the wave emitted from each emission point is a pressure wave.

The invention also relates to a method of determining the positions of a set of detectors placed under the sea, wherein the position of each detector is determined by a method according to the invention, using the same emission points.

The invention also relates to a method of mapping marine subsoil, comprising the steps of:
sampling the surface of the subsoil to be mapped at K measurement points,
placing one or more wave detectors in the vicinity of each measurement point,
determining the position of each detector using a method of the invention,
recording for each detector the wave emitted from each emission point and the waves reflected by the subsoil.

The invention also relates to a method of monitoring the evolution over time of marine subsoil, wherein the mapping method of the invention is repeated at two or more different times and the obtained maps are compared.

BRIEF DESCRIPTION OF THE DRAWINGS

The invention will be better understood by reading the following description, provided solely as an example, and by referring to the attached drawings in which.

For clarity, the various elements represented in the figures are not necessarily to scale.

DESCRIPTION OF EMBODIMENTS

In one embodiment, the method of the invention may be carried out as part of a method of mapping marine subsoil.

In the context of a method of mapping marine subsoil, the subsoil is sampled at K measurement points.

The area to be mapped may, for example, be substantially square and have dimensions of 5 km per side. The sampling of the marine subsoil may consist of positioning measurement points approximately 200 meters apart from each other.

A person skilled in the art can adjust the distances between measurement points according to predefined operating objectives.

A seismic wave detector is positioned at each measurement point. Each detector is positioned using a remotely operated vehicle (ROV). As indicated above, in this context it is generally difficult and costly to determine the position of the detector accurately when it is placed using an ROV.

In order to increase reliability and ensure repeatability of the measurements, it is important to be able to determine as accurately as possible the position of each detector placed in the vicinity of each measurement point.

Figure 1:
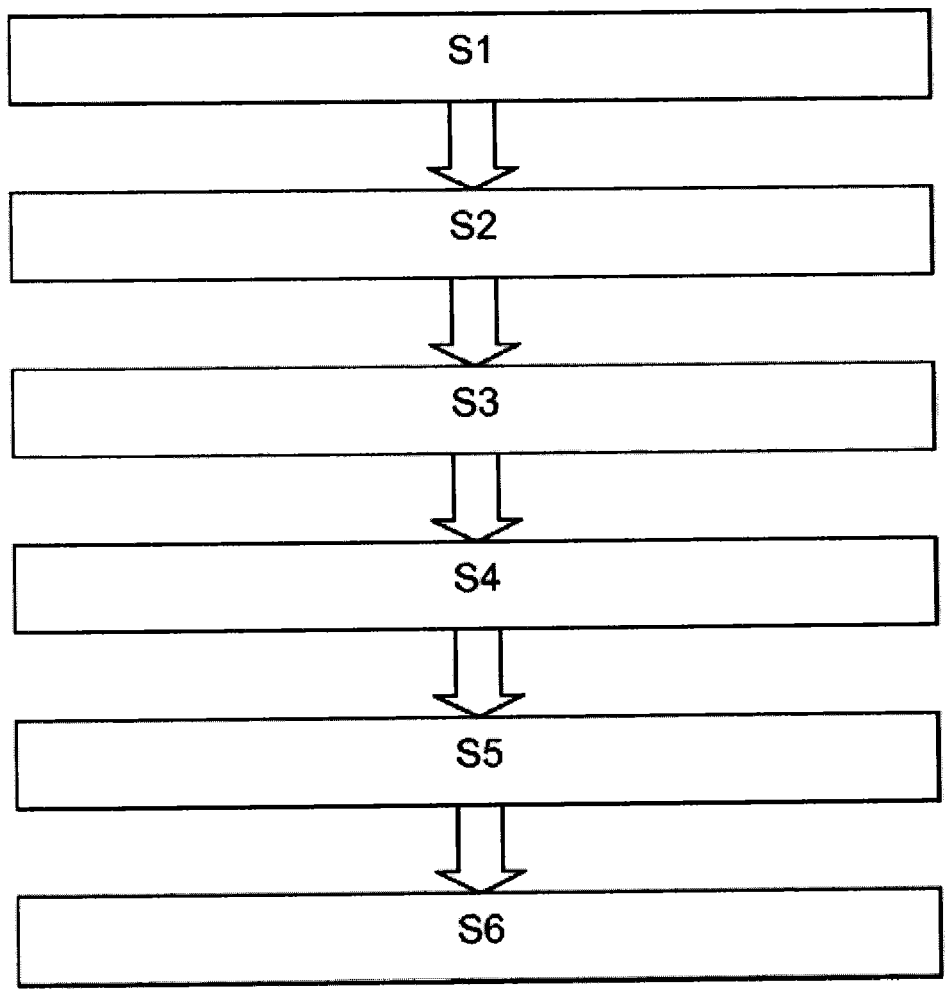
FIG. 1 illustrates the different steps of a method according to an embodiment of the invention.

As represented in FIG. 1, a method of determining the position of a detector placed under the sea according to the invention may comprise:
a step S1 of sampling from the surface of the water at N emission points,
a step S2 of emitting waves from each emission point,
a step S3 of recording the propagation times corresponding to each emission point,
a step S4 of determining time intervals,
a step S5 of determining a circle, and
a step S6 of positioning the detector.

Figure 2:
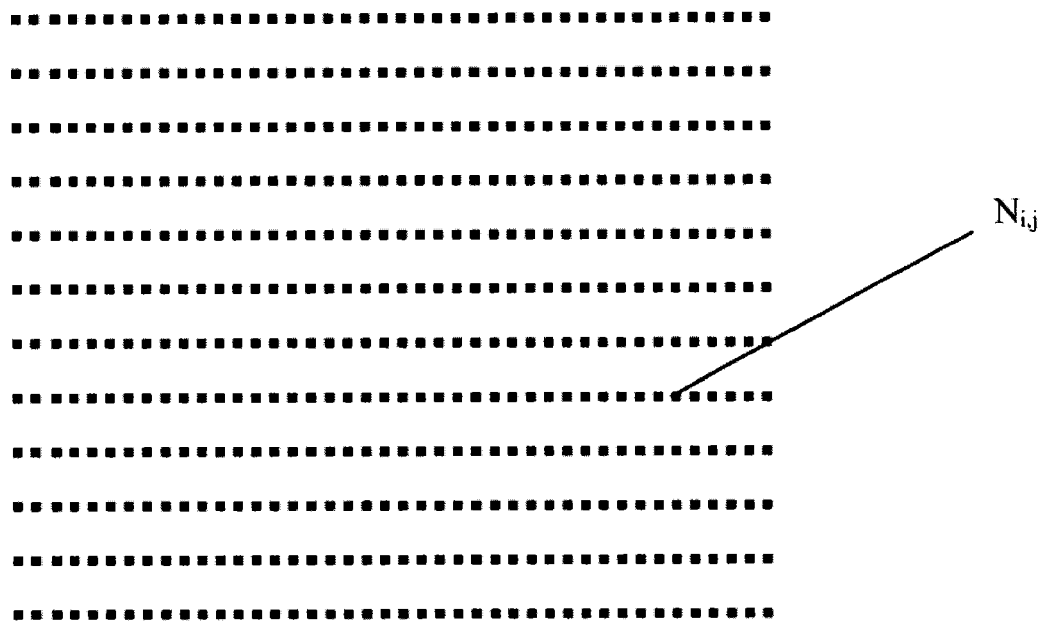
FIG. 2 illustrates the sampling from the ocean surface with N emission points.
Figure 3:
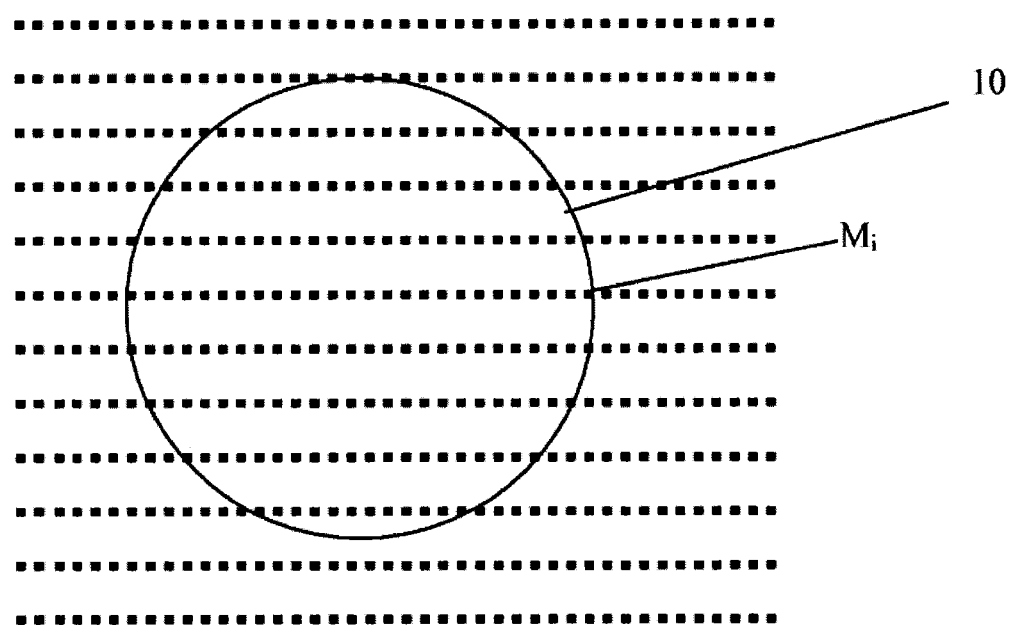
FIG. 3 illustrates the determination of the circle which passes closest to $M_i$ points among the N whose propagation time lies in a defined time interval.

As illustrated in FIG. 2, in one embodiment the ocean surface sampling is done at N emission points. At each emission point, a wave is emitted and the propagation time for said wave between the emission point and the detector whose position is to be accurately determined is recorded.

In one embodiment, a ship travels the surface of the ocean in the vicinity of the devices while regularly emitting seismic waves. The coordinates of each emission point are determined based on the known coordinates of the ship at the moment the waves are "shot".

For each emission point, the propagation time for the seismic wave between the emission point and each detector whose position is to be accurately determined is recorded.

In one embodiment of the invention, during the step S4 of determining the time intervals, P time intervals $T_i$ are determined where $P \geq 1$ such that, for each time interval $T_i$, there exist $M_i$ emission points, $M_i \geq 3$ for $1 \leq i \leq P$, among the N emission points whose propagation times lie in said time interval.

In one embodiment, the step of determining a time interval $T_i = [T_{i,1}, T_{i,2}]$ for a detector can be done by setting a first time, for example $T_{i,1}$, and determining the second time $T_{i,2}$ of the interval such that there exist at least 3 emission points for which the propagation times are between $T_{i,1}$ and $T_{i,2}$.

In one embodiment of the invention, the time interval is determined such that there exist at least 3 emission points whose propagation times are between $T_{i,1}$ and $T_{i,2}$, and the maximum angular displacement between two consecutive points of this set of points and the assumed position of the receiver are less than or equal to 120°.

The time interval $T_i$ can be determined such that there exists a number of emission points whose propagation times are between $T_1$ and $T_2$, said number being greater than or equal to 3 and less than or equal to 200, for example less than or equal to 100.

In one embodiment of the invention, during the step S5 of determining a circle, the circle which passes closest to the $M_i$ points whose propagation time lies in the time interval $[T_1, T_2]$ is determined.

This circle may be determined by any method known to a person skilled in the art.

For example, the method for determining the circle passing closest to the $M_i$ points is chosen from among the following methods:
the ordinary least squares method,
the generalized least squares method, or
the weighted least squares method.

The invention is not limited to the methods described. Any method known to a person skilled in the art may be used to determine the circle closest to the $M_i$ points.

In the invention, the ordinary least squares method consists of considering the circle which passes closest to the $M_i$ points to be the one which minimizes the quadratic sum of the variances between the $M_i$ points and said circle.

The sampling from the ocean surface at the emission points may be sufficiently dense to linearize the equations for determining the circle passing closest to the $M_i$ emission points. Advantageously, the method of the invention is easy to implement.

In one embodiment of the invention, the position of the detector is determined as being on the seabed, vertically aligned with the position of the center of the circle passing closest to the $M_i$ emission points whose propagation times are between $T_{i,1}$ and $T_{i,2}$.

In one embodiment of the invention, a plurality of time intervals and circles are determined. The position of the detector is determined as being the barycenter of the centers of the circles, for example the center of mass of the centers of the circles.

In the invention, the "center of mass" is understood to mean the barycenter of the centers of the circles determined by assigning the same weight to each center.

In one embodiment of the invention, a person skilled in the art can choose to assign different weights to the centers of the circles, for example as a function of the number of points used to determine each circle or as a function of the remainder from minimizing the quadratic sum for each circle.

The invention is not limited to the embodiments described, and is to be interpreted in a non-limiting manner to include any equivalent embodiment.

The invention claimed is:

1. A method for determining the position of a detector placed under the sea, comprising the steps of:
    emitting N waves from N emission points at a surface of the sea, where N is an integer greater than 2,
    recording for each emission point a propagation time of said wave between said emission point and the detector,
    defining P time intervals $T_i$ where P≥1 each time interval Ti being defined by setting a first time $T_{i,1}$ and, based on the recorded propagation times, determining a second time $T_{i,2}$ such that, there exist, among the N emission points, $M_i$ emission points, $M_i≥3$ for 1≤i≤P, having propagation times in said time interval,
    for each of the P time intervals $T_i$, fitting the $M_i$ points whose propagation time lies in said time interval $T_i$ with a circle, thereby creating P circles and P centers of the P circles, and
    identifying a barycenter of the P centers of the P circles,
    identifying the position of the detector at the intersection of a vertical axis passing through said barycenter and the bottom of the sea,
    outputting the position of the detector in the generation of a seismic image.

2. The method according to claim 1, wherein determining the circle passing closest to the $M_i$ points is performed by a method chosen from among the following methods:
    the ordinary least squares method,
    the generalized least squares method, or
    the weighted least squares method.

3. The method according to claim 1, wherein the P time intervals $T_i$ are determined such that, relative to the detector, the maximum angular displacement between two consecutive points $M_i$ whose propagation times lie in said time interval is less than or equal to 120°.

4. The method according to claim 1, wherein the wave emitted from each emission point is a pressure wave.

5. A method of determining positions of a set of detectors placed under the sea, the method comprising, for each detector:
    emitting N waves from N emission points at a surface of the sea, where N is an integer greater than 2,
    recording for each emission point a propagation time of said wave between said emission point and the detector,
    defining P time intervals $T_i$ where P≥1 each time interval Ti being defined by setting a first time $T_{i,1}$ and, based on the recorded propagation times, determining a second time $T_{i,2}$ such that, for each time interval $T_i$, there exist, among the N emission points, $M_i$ emission points, $M_i≥3$ for 1≤i ≤P, having propagation times in said time interval,
    for each of the time intervals $T_i$ fitting the $M_i$ points whose propagation time lies in said time interval $T_i$ with a circle, thereby creating P circles and P centers of the P circles, and
    identifying a barycenter of the P centers of the circles,
    identifying the position of the detector at the intersection of a vertical axis passing through said barycenter and the bottom of the sea,
    outputting the position of the detector in the generation of a seismic image,
    wherein the same emission points are used for each one of the detectors.

6. A method of mapping marine subsoil, comprising the steps of:
    sampling the surface of the subsoil to be mapped at K measurement points,
    placing a wave detector in the vicinity of each measurement point,
    determining the position of each wave detector, wherein determining the position of said wave detector comprises:
        emitting N waves from N emission points at a surface of the sea, where N is an integer greater than 2;
        recording for each emission point a propagation time of said wave between said emission point and the wave detector;
        defining P time intervals $T_i$ where P≥1 each time interval Ti being defined by setting a first time $T_{i,1}$ and, based on the recorded propagation times, determining a second time $T_{i,2}$ such that, for each time interval $T_i$, there exist, among the N emission points, $M_i$ emission points, $M_i≥3$ for 1≤i≤P, having propagation times in said time interval,
        for each of the time intervals $T_i$ fitting the $M_i$ points whose propagation time lies in said time interval $T_i$ with a circle, and
        identifying a barycenter of the P centers of the P circles,
        identifying the position of the wave detector at the intersection of a vertical axis passing through said barycenter and the bottom of the sea,
        outputting the position of the detector for use in the generation of a seismic image, and
    determining for each wave detector the wave emitted from each emission point and the waves reflected by the subsoil.

7. The method according to claim 6, further comprising:
    repeating at least one different time said steps of sampling the surface of the subsoil, placing wave detectors, determining the position of each detector and determining the emitted and reflected waves; and
    comparing the obtained maps.

8. A method for monitoring the evolution of a seismic image of subsoil under a seabed over time, the method comprising:
    placing at least one detector on the seabed at a first time,
    emitting N waves from N emission points at a surface of the sea above the seabed,
    where N is an integer greater than 2,
    recording for each emission point a propagation time of said wave between said emission point and the detector,
    defining P time intervals $T_i$ where P>1 each time interval $T_i$ being defined by setting a first time $T_{i,1}$ and, based on the recorded propagation times, determining a second time $T_{i,2}$ such that, there exist, among the N emission points, $M_i$ emission points, $M_i>3$ for $1<i<P$, having propagation times in said time interval, for each of the P time intervals $T_i$, fitting the $M_i$ points whose propagation time lies in said time interval $T_i$ with a circle, thereby creating P circles and P centers of the P circles, and identifying a barycenter of the P centers of the P circles, identifying the position of the detector at the first time at the intersection of a vertical axis passing through said barycenter and the bottom of the sea, implementing the above method to determine the position of the at least one detector at a second time differing from the first time, using the position of the detector at the first time and the position of the detector at the second time when determining a seismic image of the subsoil at the first time and the second time.

\* \* \* \* \*